Patented July 7, 1931

1,813,867

UNITED STATES PATENT OFFICE

HORACE A. SHONLE, OF INDIANAPOLIS, INDIANA, ASSIGNOR TO ELI LILLY AND COMPANY, OF INDIANAPOLIS, INDIANA, A CORPORATION OF INDIANA

N-AMYL ETHYL BARBITURIC ACID AND ITS INTERMEDIATES

No Drawing.   Application filed July 20, 1928.   Serial No. 294,318.

My invention has for its object the obtaining of a substance which possesses marked hypnotic activity combined with low toxicity, and relate to the production of the hitherto unknown hypnotic substance, n-amyl ethyl barbituric acid or n-amyl ethyl malonyl urea.

n-amyl ethyl barbituric acid exhibits pronounced soporific or hypnotic properties, and at the same time has a low toxicity.

The new n-amyl ethyl barbituric acid possesses the structure

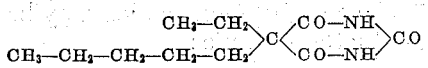

in which one of the hydrogen atoms attached to a nitrogen atom can be replaced by a monovalent metal, such, for instance, as sodium, or by an equivalent of a polyvalent metal, such, for instance, as calcium or magnesium, or by the ammonium ion, or by an organic base, such for example as methyl amine, diethyl amine, etc.

The new n-amyl ethyl barbituric acid may be produced by various processes. One of these consists in condensing urea with n-amyl ethyl malonic ester (or ethyl in-amyl-ethyl-malonate) in the presence of sodium ethylate, using substantially the following quantities, temperatures, and periods of time, although the product may still be obtained in varying yields even if these factors are changed:—

26.7 grams (3 moles) of metallic sodium are dissolved in from 300 to 500 grams of absolute alcohol, to which are added 100 grams (1 mole) of n-amyl ethyl malonic ester and 37.2 grams (1.6 mole) of urea. This mixture is heated in an autoclave for 4 to 6 hours at a temperature of about 105° C.

If preferred, such mixture may instead be heated in a container under a reflux condenser at atmospheric pressure in a boiling water bath for 20 to 40 hours.

The n-amyl ethyl barbituric acid formed by this condensation is present as its sodium salt. The mixture is then acidified with hydrochloric acid and the alcohol removed by distillation. The crude n-amyl ethyl barbituric acid remains as a residue in the distilling flask.

If desired, the alcohol may instead first be removed from the mixture by distillation, the paste-like residue of the sodium salt of n-amyl ethyl barbituric acid then dissolved in cold water, and hydrochloric acid then added in excess; whereupon the crude n-amyl ethyl barbituric acid is precipitated.

This crude n-amyl ethyl barbituric acid upon recrystallization from water, dilute alcohol, or benzene, is obtained in the form of white crystals, which melt at 135° to 136° C. The re-crystallized substance is slightly soluble in cold water, more soluble in hot water, and easily soluble in alcohol and ether, and has a slightly bitter taste, and forms with the alkali metals salts which are readily soluble in water.

Since n-amyl ethyl barbituric acid possesses one nitrogen-linked hydrogen capable of being replaced with a monovalent metal, such as sodium, or with an equivalent of a polyvalent metal, such as magnesium, or with the ammonium ion, or with organic bases, it is possible to form salts of this acid. The acid and the salts may be represented by the following formula:

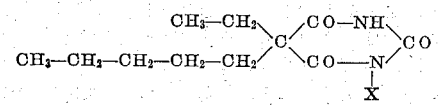

in which X represents either a hydrogen atom or an atom of a monovalent metal or an equivalent of a polyvalent metal or the ammonium ion or an organic base. The sodium salt, which may be formed by treating one mole of n-amyl ethyl barbituric acid with one mole of sodium hydroxide in a suitable solvent, is readily soluble in cold water, and somewhat less soluble in absolute alcohol.

The calcium and magnesium salts, which may be formed by adding one mole of n-amyl ethyl barbituric acid to a solution of a half mole of a calicum or magnesium compound, are less soluble than the sodium salt, the calcium salt being relatively insoluble in water. The ammonium salts or the salts of organic bases, which may be made by dissolving one mole of n-amyl ethyl barbituric acid in a solution of a slight excess beyond one mole of ammonium hydroxide or the organic base, are also water-soluble.

When n-amyl ethyl barbituric acid is dissolved in alcohol with varying molecular amounts of pyramidone (4-dimethylamino-1-phenyl-2-3-dimethyl-5-pyrazalone), and the alcohol evaporated and the residue dried in vacuo, a mixture or product results having a melting point that is lower than that of either constituent. For example, with 1 mole of each constituent, the resultant mixture or product has a melting point of 74.5° to 79° C.; when 1 mole of the n-amyl ethyl barbituric acid is used with 1.5 mole of the pyramidone, the resultant mixture or product has a melting point of 75° to 78° C.; and with 1 mole of n-amyl ethyl barbituric acid and 2 moles of pyramidone are used, the resultant mixture or product has a melting point of 72° to 77° C.

When equal molecular amounts of n-amyl ethyl barbituric acid and hydrocuprein are dissolved in alcohol, boiled, and concentrated, a product results which has a melting point of 71° to 83° C.

Another variation, which is deemed preferable because it permits a recovery of the absolute alcohol used, follows:

26.7 grams (3 moles) of metallic sodium are dissolved in 300 grams of absolute alcohol, to which are added 100 grams (1 mole) of n-amyl ethyl malonic ester and 37.2 grams (1.6 moles) of urea. About 75% to 85% of the absolute alcohol is now distilled off under diminished pressure, and the flask containing the remaining mixture is heated under a reflux condenser in an oil bath held at 125° to 150° C. for a period of from 3 to 5 hours. At the end of this time, the contents of the flask are dissolved in cold water, and an excess of hydrochloric acid is added, which precipitates the n-amyl ethyl barbituric acid.

This last method has been used in the preparation of isoamyl ethyl barbituric acid, benzyl ethyl barbituric acid, and other dialkyl and alkyl-aryl barbituric acids, and is a general method of value.

So far as I know, the n-amyl ethyl malonic ester used in the processes given above is a new product. It may be prepared by the following process:

12.5 grams (1 mole) of sodium are dissolved in 125 grams of absolute alcohol, and 100 grams (1 mole) of ethyl malonic ester are added. After standing a few minutes, about 75% to 90% of the absolute alcohol is then removed by vacuum distillation. The sodium salt of the ethyl malonic ester now remains in the flask in a pasty form. The flask containing this is now connected to a reflux condenser, and 85 grams (a slight excess above 1 mole) of n-amyl bromide are gradually added. After the resultant initial reaction subsides, the flask is heated in an oil bath under a reflux condenser at a temperature of approximately 125° C. for about an hour. The alcohol and excess n-amyl bromide are now distilled off, and water is added; and the layer of n-amyl ethyl malonic ester is separated, dried over calcium chloride, and fractionally distilled.

n-amyl ethyl malonic ester boils, at a pressure of 10 mm. of mercury, between 134° and 138° C. It has the formula:

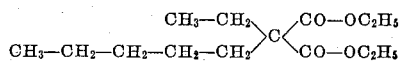

The method just described of preparing n-amyl ethyl malonic ester has also been used in the preparation of isoamyl ethyl malonic ester, secondary-butyl ethyl malonic ester, etc.; and is a general method of value.

The n-amyl ethyl barbituric acid and the n-amyl ethyl malonic ester have in common a radicle of the following formula:

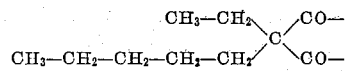

So far as I am aware, products containing this radicle which is common to n-amyl ethyl barbituric acid and to n-amyl ethyl malonic ester have not hitherto been known.

I claim as my invention:

1. The new substances, which may be represented by the formula:

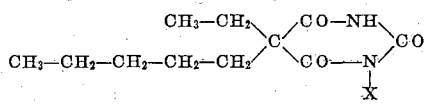

wherein X represents either a hydrogen atom, an atom of a monovalent metal, or an equivalent of a polyvalent metal, or the ammonium ion, or an organic base.

2. The new substance, n-amyl ethyl barbituric acid, being a compound displaying a hypnotic action, crystalizing from water in the form of white crystals melting at 135° to 136° C., being slightly soluble in cold water, more soluble in hot water, easily soluble in alcohol and ether, having a slightly bitter taste, and forming with the alkali metals salts which are readily soluble in water.

3. The new substances, which contain the radicle which may be represented by the formula:

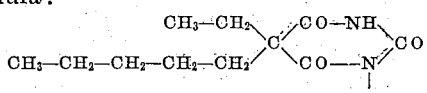

4. As a new product n-amyl ethyl barbituric acid having the formula:

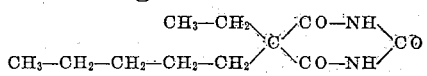

5. The new substances, which contain a radicle which may be represented by the following formula:

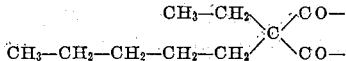

6. The new substance, n-amyl ethyl malonic ester, usable in the preparation of n-amyl ethyl barbituric acid, having the formula:
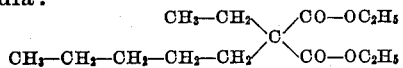
7. The new substance, sodium n-amyl ethyl barbiturate, which may be represented by the formula:
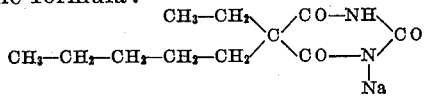
In witness whereof, I have hereunto set my hand at Indianapolis, Indiana, this 19th day of July, A. D. one thousand nine hundred and twenty-eight.
HORACE A. SHONLE.